Figure 1:
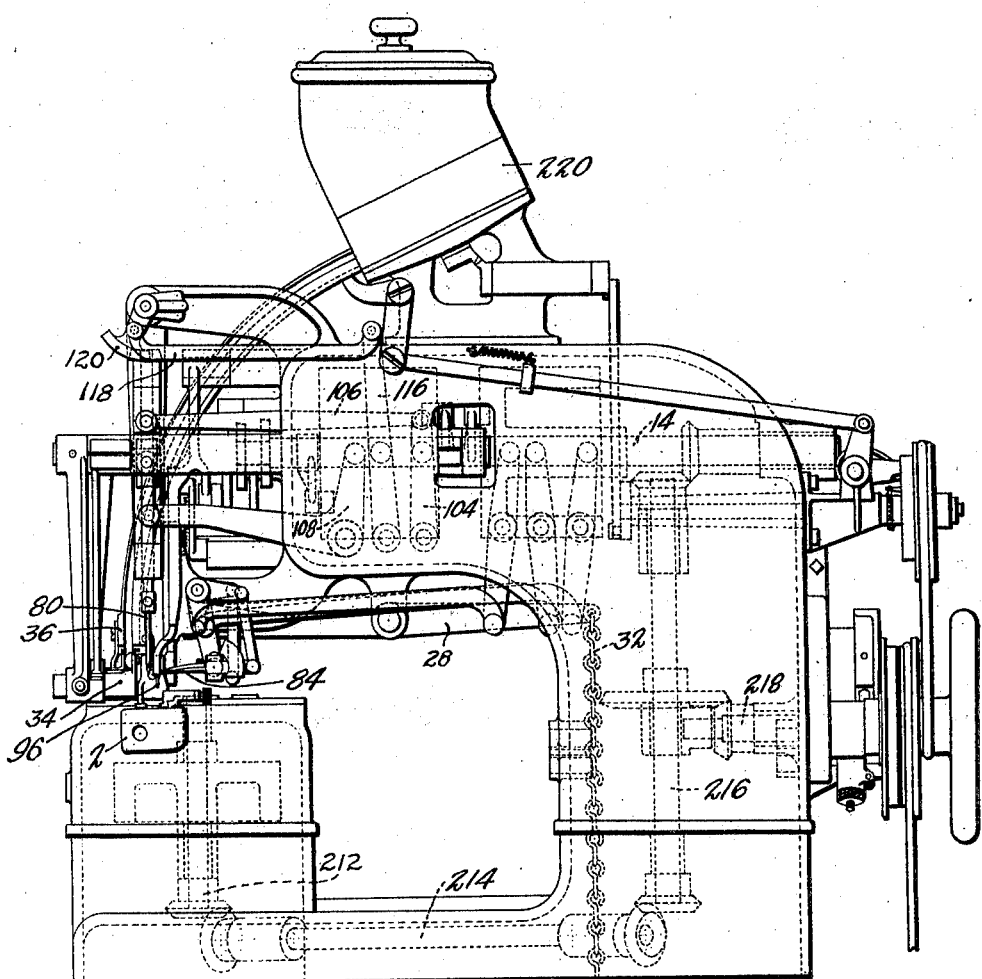

W. A. SMITH.
BUTTON SEWING MACHINE.
APPLICATION FILED MAR. 30, 1918.

1,399,527.

Patented Dec. 6, 1921.
9 SHEETS—SHEET 1.

Witness
J. L. O'Neil

Inventor
Willard A. Smith
Van Everen Fish & Hildreth
Attys.

W. A. SMITH.
BUTTON SEWING MACHINE.
APPLICATION FILED MAR. 30, 1918.

1,399,527.

Patented Dec. 6, 1921.

9 SHEETS—SHEET 2.

W. A. SMITH.
BUTTON SEWING MACHINE.
APPLICATION FILED MAR. 30, 1918.
1,399,527.
Patented Dec. 6, 1921.
9 SHEETS—SHEET 3.
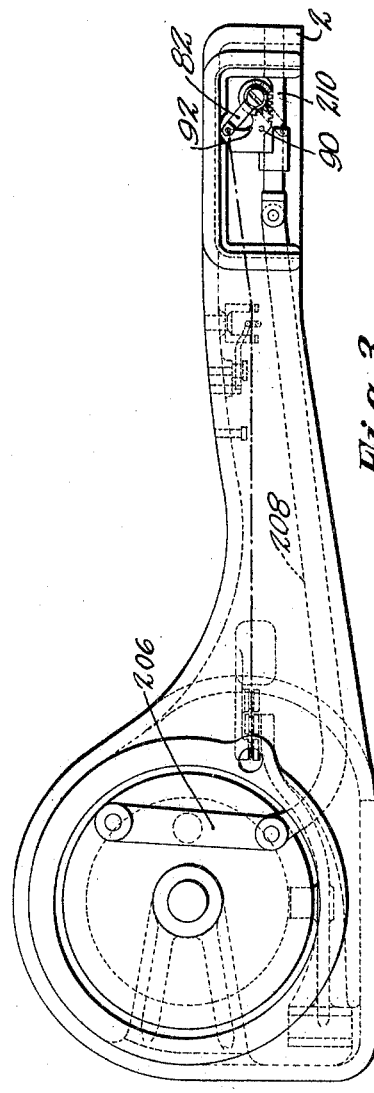
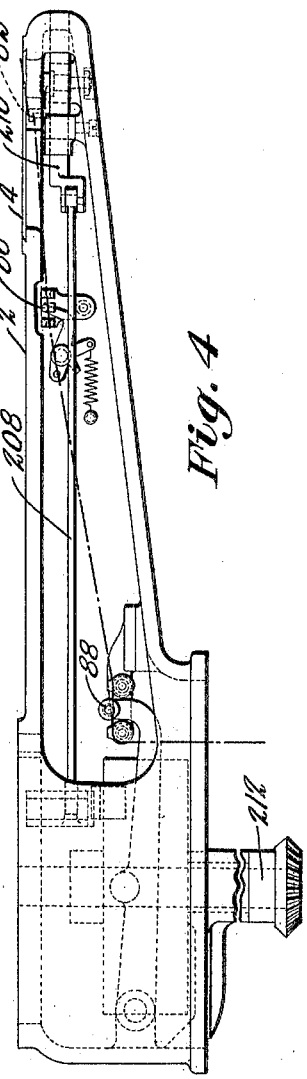
Witness
J. L. O'Neil
Inventor
Willard A. Smith
by Van Evera Fish & Hildreth
Attys

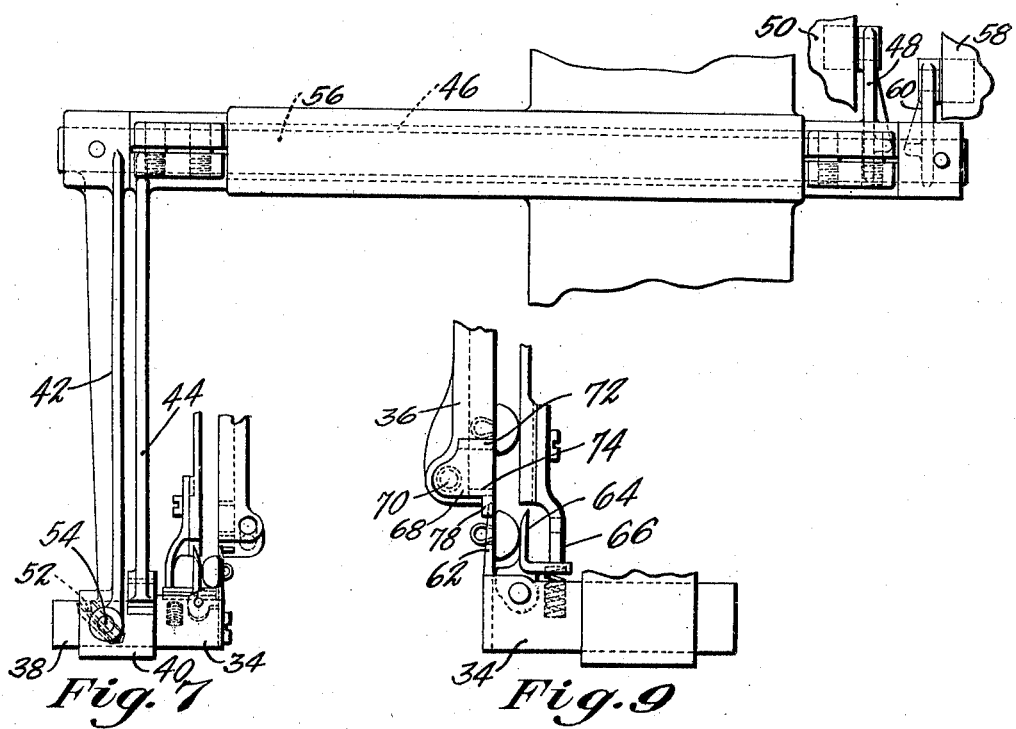
W. A. SMITH.
BUTTON SEWING MACHINE.
APPLICATION FILED MAR. 30, 1918.
1,399,527.
Patented Dec. 6, 1921.
9 SHEETS—SHEET 5.
Fig. 7
Fig. 9
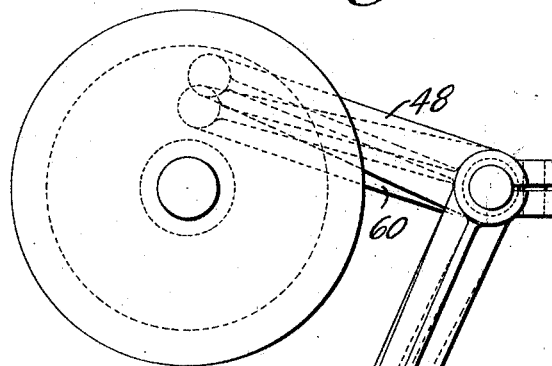
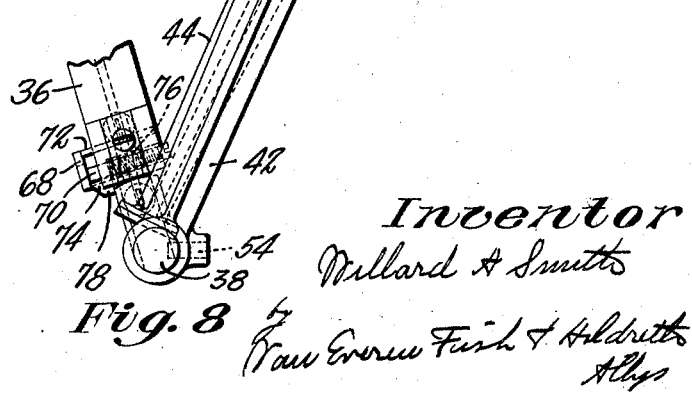
Fig. 8
Witness
J. L. O'Neil
Inventor
Willard A. Smith
by Roger Sherman Fish & Hildreth
Attys

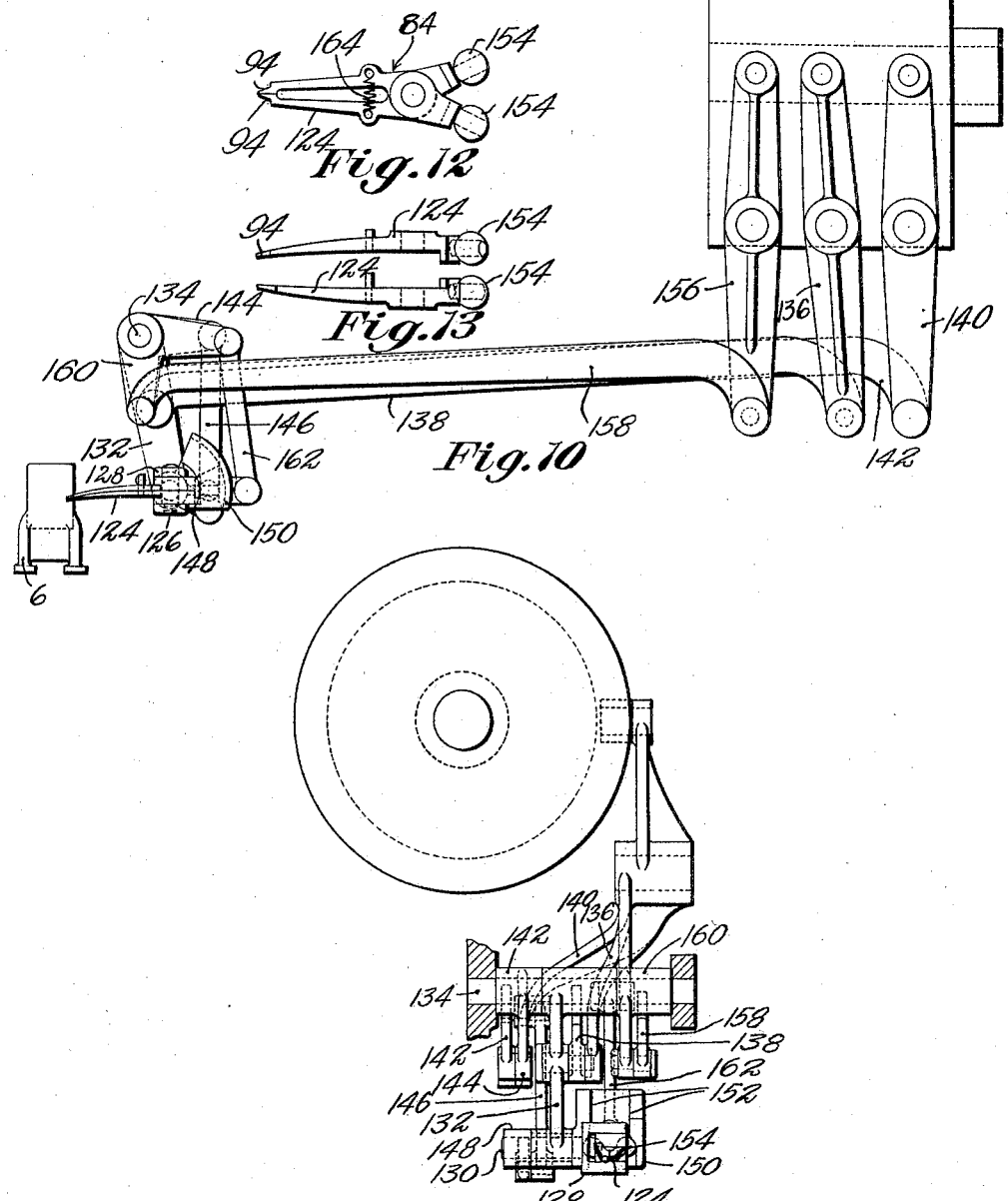

W. A. SMITH.
BUTTON SEWING MACHINE.
APPLICATION FILED MAR. 30, 1918.

1,399,527.

Patented Dec. 6, 1921.
9 SHEETS—SHEET 7.

Witness
J. L. O'neil

Inventor
Willard A. Smith
by Van Everen Fish & Hildreth
Attys

UNITED STATES PATENT OFFICE.

WILLARD A. SMITH, OF MELROSE, MASSACHUSETTS, ASSIGNOR TO UNITED SHOE MACHINERY CORPORATION, OF PATERSON, NEW JERSEY, A CORPORATION OF NEW JERSEY.

BUTTON-SEWING MACHINE.

1,399,527.   Specification of Letters Patent.   Patented Dec. 6, 1921.

Application filed March 30, 1918. Serial No. 225,618.

*To all whom it may concern:*

Be it known that I, WILLARD A. SMITH, a citizen of the United States, residing at Melrose, in the county of Middlesex and State of Massachusetts, have invented certain new and useful Improvements in Button-Sewing Machines; and I do hereby declare the following to be a full, clear, and exact description of the invention, such as will enable others skilled in the art to which it appertains to make and use the same.

The invention relates to machines for sewing shank eyed buttons to shoe tops or other articles, and more particularly to machines which automatically space the work between button attaching cycles.

One object of the invention is to so construct and arrange the button attaching and work feeding mechanisms that the button attaching loops may be passed through a superposed buttonhole in attaching each button of a series, thus insuring the accurate register of the buttons with the buttonholes, and also eliminating the subsequent buttoning operation heretofore necessary in manufacturing shoes. To this end the attaching mechanism is constructed to pass the attaching loops or stitches through the material to which the button is to be attached at points spaced apart transversely of the feed. The attaching loops will therefore extend from one needle hole to the other at substantially right angles to the edge of the material along which the buttons are to be attached, or lengthwise of the corresponding buttonhole, and consequently may be readily passed through the buttonholes in attaching the buttons. This manner of attaching the buttons may also be advantageously employed without regard to whether the buttons are attached through the buttonholes or not, since it results in so locating the button shanks that they are parallel to the edge of the material and crosswise of the buttonholes when engaged with the buttons. This tends to distribute the wear and strain on the ends of the buttonholes while any strain on a button will be a lengthwise instead of a transverse strain on the attaching thread.

The invention will be readily understood from an inspection of the accompanying drawings and the following detailed description of the machine illustrated therein.

Figure 2:
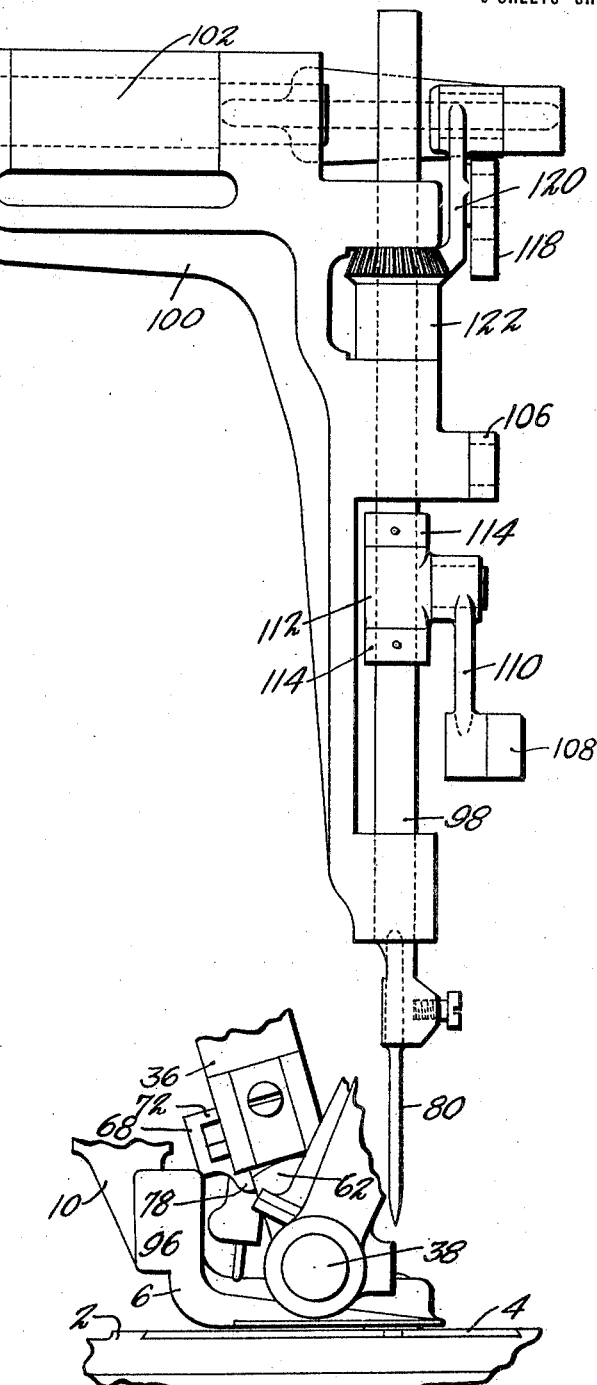
Figure 5:
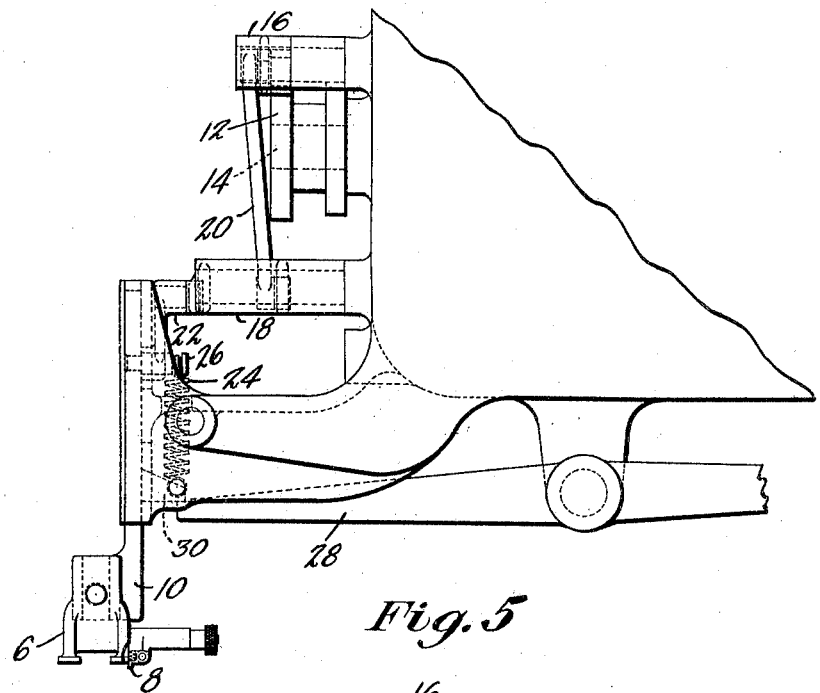
Figure 6:
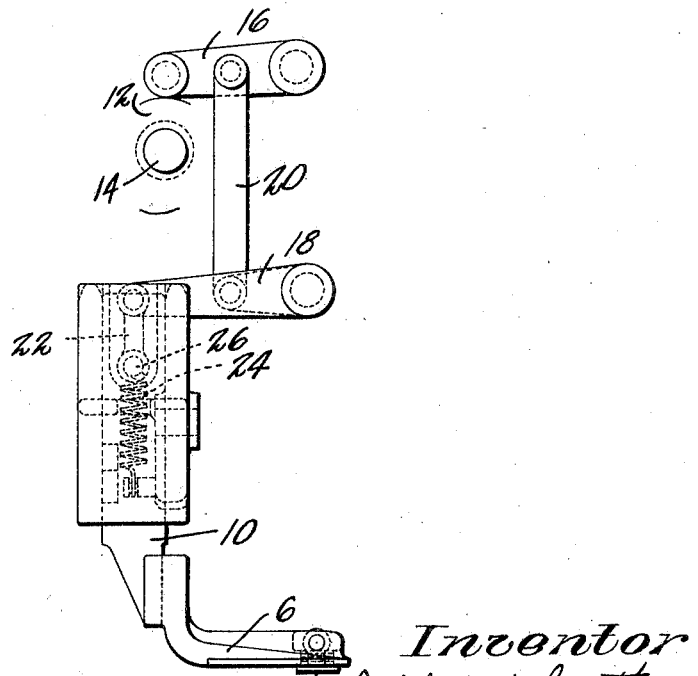
Figure 15:
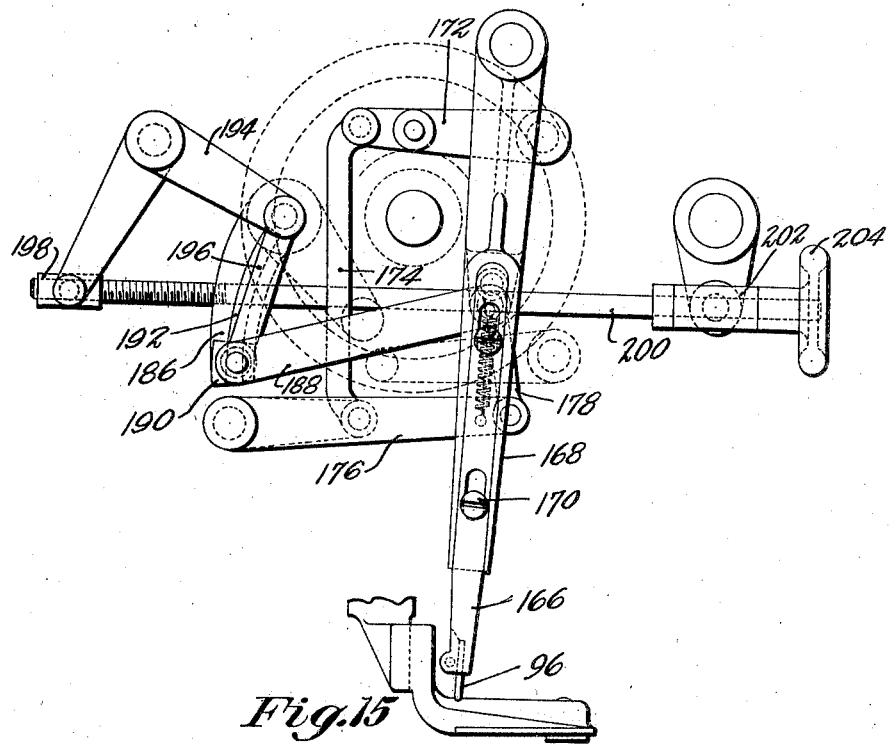
Figure 14:
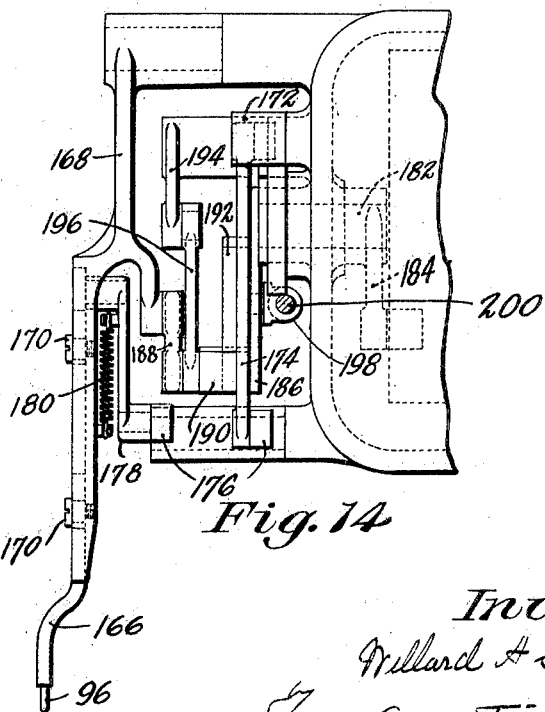
Figure 16:
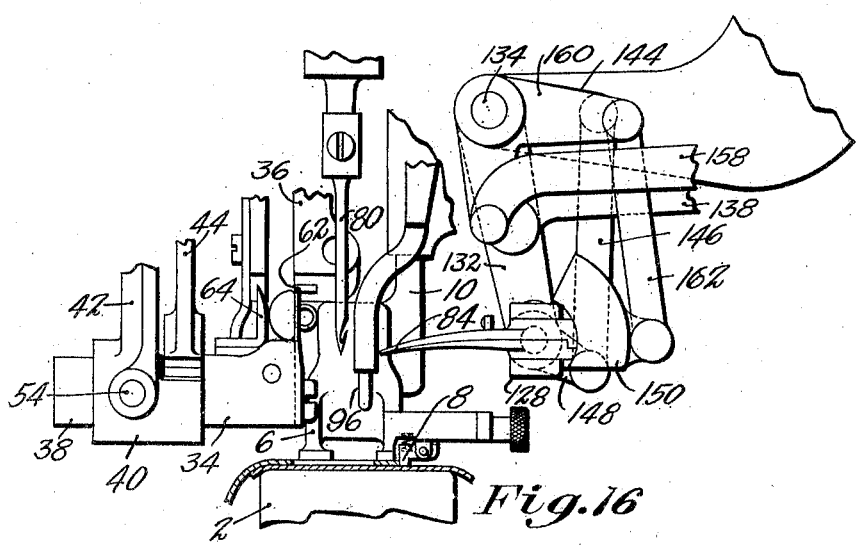

In the drawings, Figure 1 is a side elevation of a machine embodying the invention in its preferred form; Fig. 2 is a partial front elevation on a larger scale looking toward the right in Fig. 1; Fig. 3 is a plan view of the work supporting horn with the throat plate removed; Fig. 4 is a front elevation of the horn; Fig. 5 is a detail side elevation showing the presser foot mechanism; Fig. 6 is a front elevation of the same; Fig. 7 is a detail side view looking toward the left in Fig. 8, showing the button carrier and its operating mechanism; Fig. 8 is a front elevation of the same; Fig. 9 is a side elevation on a larger scale, looking toward the right in Fig. 8; Fig. 10 is a detail side elevation showing the loop taker and carrier and its operating mechanism; Fig. 11 is a front view looking toward the right in Fig. 10; Figs. 12 and 13 are detail views of the loop taker and carrier; Fig. 14 is a detail side elevation showing the feeding finger and its operating mechanism; Fig. 15 is a front elevation of the parts shown in Fig. 14; Fig. 16 is a partial side elevation showing the button feeding and attaching mechanism on a somewhat larger scale than in Fig. 1; and Figs. 17 to 25 are diagrammatic views illustrating the mode of operation of the button attaching mechanism.

The machine shown in the drawings is designed to sew buttons on shoe tops through the buttonholes. Preparatory to sewing on the buttons the buttonhole fly is properly positioned on the opposite side of the shoe top, and is held in position during the sewing of the buttons, either by the operator or by a clamping clip at the upper end of the fly. The shoe top is placed over a work supporting horn, with the upper or lower buttonhole, as the case may be, in register with the sewing mechanism, and then buttons are successively attached through the buttonholes, so that the top leaves the machine in a buttoned condition. The buttons are attached by a primary loop which is drawn up through the shoe top, superposed buttonhole and button eye, and a secondary loop which is drawn up through the shoe top, buttonhole and primary loop outside the eye and is passed over the button. After each button is attached the work is spaced by a feeding finger which engages a succeeding buttonhole and brings it into register with the sewing mechanism.

The work supporting horn is in the form of a horizontally projecting arm 2, the outer end of which is provided with a throat plate 4 for supporting the shoe top during the sewing (Figs. 1 to 4). The work is clamped in position on the horn by a presser foot 6, the work engaging feet of which are separated to leave a slot or space for the button (Figs. 1 to 6 and 16). The presser foot carries a spring pressed and adjustable edge guide 8 for guiding and positioning the work by engagement with the edge of the button hole fly, as indicated in Fig. 16. The presser foot is secured upon the lower end of a vertical movable slide 10 which is raised to permit the feed of the work by a cam 12 secured to the forward end of the cam shaft 14 and connected with the slide by the levers 16 and 18 and the links 20 and 22. The presser foot is normally pressed against the work by a spring 24 connected to the pivot pin 26 of the link 22. The presser foot may be raised to insert or withdraw the work through a lever 28, the forward end of which is arranged to engage a lug 30 on the slide 10, and the rear end of which is connected by a joint 32 with a treadle (not shown).

The means for feeding the buttons comprises a button carrier 34 arranged to take a button from the lower end of a button chute 36 and to present it in position above the buttonhole and in register with the button attaching mechanism (Figs. 1, 2, 7 to 9 and 16). The carrier is secured on the end of a rock shaft 38 which is mounted to oscillate and move endwise in a bearing 40 formed in the lower end of a swinging arm 42. The shaft is rocked at the proper intervals by a gear segment 44 engaging gear teeth on the shaft and secured to one end of a rock sleeve 46, the other end of which carries an arm 48 engaged by a cam 50 on the cam shaft. When the shaft is rocked it is moved endwise by a spiral slot 52 formed in the shaft and engaged by a pin 54. The arm 42 is secured to a rock shaft 56 which is rocked at proper intervals by a cam 58 engaging an arm 60 secured thereto. The carrier is provided with a positioning plate 62 slotted to receive the shank of the button, and is also provided with a pivoted spring pressed clamp 64 for engaging the head of the button and holding it against the positioning plate. When the carrier is in button receiving position at the end of the button chute the slot in the positioning plate 62 registers with the shank guiding slot of the chute, and the clamp is held open against the pressure of its spring by an arm 66 secured to the end of the chute and arranged to engage the tail of the clamp. The lowermost button is separated from the buttons in the chute and delivered to the carrier by a button separator in the form of a plate 68 secured on the end of a transversely sliding pin 70 and provided with upper and lower separator fingers 72 and 74 which project across the shank guiding slot of the chute. A spring 76 holds the separator in normal position with the plate 68 against the side of the chute. When the separator is in this position a slot in the upper finger 72 registers with the shank guiding slot of the chute, while the lower finger 74 closes the lower end of the shank guiding slot and supports the column of buttons in the chute. When the carrier swings into button receiving position, the positioning plate 62 strikes a lug 78 on the button separator and moves the separator laterally into the position indicated in Fig. 8. This movement carries the slot in the upper finger 72 out of register with the shank guiding slot of the chute so that this finger acts to support the column of buttons in the chute. This movement also withdraws the lower finger so that the lower button is free to drop into the shank receiving slot of the positioning plate 62, as indicated in Fig. 9. When the carrier swings away from the lower end of the button chute the button separator returns to normal position, and the column of buttons slides down until the lower button is supported upon the lower finger 74 as before. The swinging movement of the carrier also disengages the tail of the button clamp from the arm 66, so that the clamp acts to hold the button in position in the carrier during the swinging and lateral movement of the carrier, which brings the eye of the button into register with the sewing mechanism. After the primary loop has been passed through the eye of the button, the arm 42 which supports the carrier is swung to withdraw the button from the clamp, and thereafter the parts are moved to return the carrier into position to receive the succeeding button from the lower end of the button chute.

Figure 17:
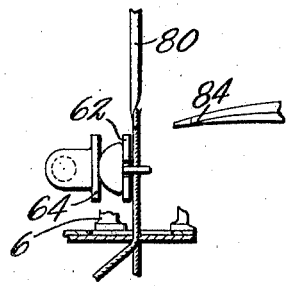
Figure 18:
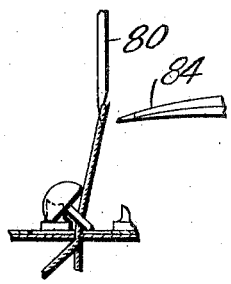
Figure 19:
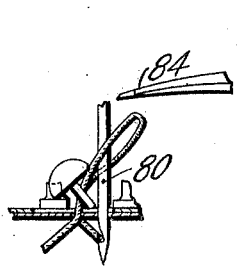
Figure 20:
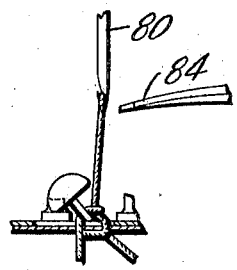
Figure 21:
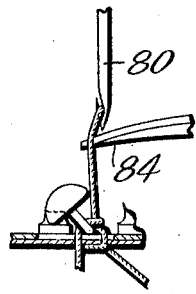
Figure 22:
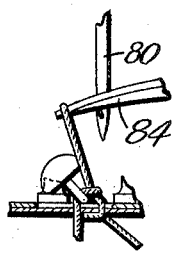
Figures 23, 24:
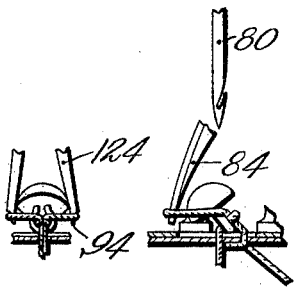
Figure 25:

The button attaching mechanism comprises a hook needle 80 for drawing the primary and secondary loops through the work, a laterally swinging looper arm 82 arranged within the horn 2 which places the thread in the hook of the needle, a loop taker and carrier 84 which takes the secondary loop from the needle, spreads it and carries it over the button, a spring operated slack thread controller 86, and a cam operated takeup 88 for controlling the thread and for taking up and tightening the button attaching loops (Figs. 1 to 4 and 16). During the first downward stroke of the needle it passes through the eye of the button which has been presented in attaching position by the button carrier, through the buttonhole at some distance from its eye end, and through the material beneath the buttonhole, the position of the needle within the work supporting horn after it has passed through the work being indicated in dotted lines at 90 in Fig. 3. The looper arm 82 is then swung from the full line to the dotted line position in Fig. 3, and presents the thread to the needle so that when the needle rises the thread will be engaged by the hook of the needle, and a loop will be carried up through the work and through the eye of the button, as indicated in Fig. 17. The button carrier is then swung bodily back out of the plane of the drawing (Fig. 17), thus withdrawing the partially attached button from the carrier, so that it drops down on to the presser foot, as indicated in Fig. 18. The needle is then moved transversely of the feed, or lengthwise of the buttonhole, as indicated in this figure, so that during its next descent it will pass through the primary loop and through the eye end of the buttonhole outside the button eye. During this descent of the needle it is turned through an angle of 180° so that its hook will face away from the end of the primary loop and toward the button, as indicated in Fig. 19. The position of the needle within the horn after it has made its second descent is indicated at 92 in Fig. 3. The looper arm 82 is then swung from the dotted line to the full line position of Fig. 3, thus presenting the thread to the hook of the needle. During its second upward stroke the needle therefore carries this secondary loop up through the work and through the primary loop outside the eye of the button, the primary loop being taken up by the needle or by the needle and takeup, as indicated in Fig. 20. The loop taker and spreader 84, which consists of the pivoted fingers 94, then moves forward into the secondary loop, as indicated in Fig. 21, and carries it laterally, so that as the needle dips between the fingers the secondary loop is carried away from the needle, since the needle hook at this time faces the button or in the direction toward which the loop is carried, as indicated in Fig. 22. The loop carrying fingers continue to move laterally and downwardly, and as they move they are separated to spread the secondary loop and carry it down over the button head, as indicated in Figs. 23 and 24. They are then withdrawn to release the secondary loop, as indicated in Fig. 25, and this loop is then taken up and tightened to complete the knot by the action of the takeup. While the secondary loop is being carried over the button head the needle is returned to its initial position, as indicated in Fig. 25. After the button attaching cycle is completed, the pressure of the presser foot upon the work is relieved, and the work is spaced by a feeding finger 96 which is brought into engagement with the succeeding buttonhole, and then moves lengthwise of the supporting horn, i. e. crosswise of the buttonhole, to bring the buttonhole and work into position for attachment of the succeeding button.

The needle is secured in a vertically reciprocating needle bar 98 mounted in a carrier 100 which is supported at its upper end upon a pivot 102, and is swung laterally by a cam operated lever 104 connected with the carrier by a link 106. The needle bar is reciprocated by a cam operated bell crank lever 108, the forward end of which is connected by a link 110 with a sleeve 112 surrounding the needle bar and held between the collars 114. The needle bar is oscillated through 180° between successive reciprocations by a cam lever 116, the upper end of which is connected by a link 118 with a segment 120 which is mounted on a stud in line with the pivot 102 for the needle bar carrier, and engages a bevel gear 122 which is connected to rotate the needle bar while permitting its reciprocation.

The loop taking and spreading fingers 94 are formed on the forward ends of two levers 124 which are mounted on a pivot stud 126 between the upper and lower arms of a U-shaped head 128 which is formed on the end of a shaft 130 (Figs. 10 to 13 and 16). The shaft is mounted in a bearing in the lower end of a supporting arm 132 which is swung about a stud 134 by a cam lever 136 and link 138 to advance and retract the loop taking and spreading fingers 94. The shaft is rocked in its supporting arm to move the fingers vertically by a cam lever 140 connected by a link 142 to one arm of a bell crank lever 144, the other arm of which is connected by a link 146 with an arm 148 secured to the end of the shaft. The fingers are separated to spread the loop by a cam segment 150 formed on the end of a sleeve surrounding the shaft 130. This segment is provided with two oppositely arranged cams 152 arranged to engage balls 154 on the rear ends of the levers 124. The cam segment is rocked to separate the fingers at the forward ends of the levers by a cam lever 156 connected by a link 158 with one arm of a bell crank lever 160, the other arm of which is connected by a link 162 with the segment. The levers are held normally with the fingers 94 in contact with each other by a spring 164, as indicated in Fig. 12.

The feed finger 96 is secured in the lower end of a slide 166 which is mounted in a swinging feed arm 168. The slide is retained in a guideway in the feed arm by the screws 170 which pass through slots in the slide. It is moved vertically to engage the feeding finger with and disengage it from the work by a cam lever 172 connected by a link 174 with one arm of a lever 176, the other arm of which is connected by a link 178 with the upper end of the slide. The slide is forced yieldingly toward the work by a spring 180. The feed arm is swung in the line of feed by a cam operated rock shaft 182, the rear end of which carries an arm 184 engaged by a cam on the cam shaft, and the forward end of which carries a segment arm 186 connected by a link 188 with the feed arm. The link is connected with the segment arm by a pivot block 190 mounted to slide on a guide rod 192, and held in adjusted position thereon by a bell crank lever 194, one arm of which is connected to the pivot block by a link 196, and the other arm of which is connected to an adjustable nut 198 on the screw threaded rod 200. The forward end of the rod is supported in a bearing sleeve 202, and is provided with an operating handle 204 by which it may be turned to adjust the position of the pivot block on the segment arm 186 and thereby adjust the throw of the feed arm in accordance with the distance between the buttonholes. The throw of the feed arm should be so adjusted that the movement of the feed finger is somewhat greater than the distance between successive buttonholes. When so adjusted, the feed finger will first engage the work beyond the buttonhole, and then as the feed arm moves forward the finger will slide along the surface of the work until it reaches and enters the buttonhole, after which it will feed the work forward to bring the buttonhole into register with the button presenting and stitch forming mechanism.

The looper arm 82 is oscillated at proper intervals by a cam operated lever 206 connected by a link 208 with a sliding rack bar 210 which engages a pinion secured to the rock shaft on which the arm is mounted.

The cam for operating the lever 206, and the cam for operating the takeup 88, may be formed in a cam drum secured to a vertical shaft 212 connected through a shaft 214 with the vertical shaft 216 through which motion is transmitted to the main cam shaft 14 (Fig. 1). The shaft 216 is driven from the driving shaft 218, which may be provided with any suitable stop mechanism for automatically stopping the machine after the predetermined number of buttons for which its controlling mechanism has been adjusted have been sewed on. The buttons are supplied to the button chute through a hopper indicated at 220.

While it is preferred to employ the specific construction and arrangement of parts shown and described, it will be understood that this construction and arrangement is not essential to the broader features of the invention, and may be varied or modified as found desirable or best suited to the construction of the machine in which any of the features are to be embodied.

Having explained the nature and object of the invention, and specifically described one form of mechanism in which it may be embodied, what is claimed is:—

1. A button attaching machine having, in combination, a work supporting horn constructed to support the overlapping opposite edges of a piece of work and to permit movement of the work endwise of the horn to bring a series of buttonholes in the overlying edge successively into button-attaching position, means for feeding shank-eyed buttons into position with the shank above the button-hole, and a sewing mechanism for passing button-attaching loops through the shank, buttonhole, and underlying material.

2. A button attaching machine having, in combination, means for supporting a buttonholed material and an underlying material, sewing mechanism for passing button attaching loops through a buttonhole and the underlying material, mechanism for feeding buttons into attaching position above a buttonhole, and mechanism for spacing the work to bring the buttonholes successively into register with the sewing mechanism.

3. A button attaching machine, having, in combination, means for supporting a buttonholed material and an underlying material, sewing mechanism for passing button attaching loops through a buttonhole and the underlying material, mechanism for presenting shank eyed buttons in atatching position, and mechanism for spacing the work to bring the buttonholes successively into register with the sewing mechanism.

4. A button attaching machine, having, in combination, a work supporting horn adapted to support the buttonhole fly and the underlying opposite side edge of a shoe top and to permit movement of the shoe top endwise of the horn to bring a series of buttonholes in the fly successively to button-attaching position, mechanism for feeding shank eyed buttons into attaching position with the shank above the buttonhole which is in button attaching position, and stitch forming mechanism for attaching the button through the buttonhole to said underlying side edge.

5. A button attaching machine, having, in combination, a work supporting horn adapted to support the buttonhole fly and the underlying opposite side edge of a shoe top, mechanism for feeding shank eyed buttons into attaching position above a buttonhole, mechanism for attaching the button through the buttonhole to said underlying side edge, and mechanism for spacing the shoe top to bring successive buttonholes into register with the stitch forming mechanism.

6. A button attaching machine, having in combination, mechanism for attaching a button through a buttonhole, and means for engaging a buttonhole and feeding it into register with the button attaching mechanism.

7. A button attaching machine, having, in combination, mechanism for feeding the work by engagement with a series of buttonholes therein, stitch forming mechanism for passing button attaching loops through a buttonhole, and mechanism for presenting buttons in button attaching position.

8. A button attaching machine, having in combination, button feeding mechanism, work spacing mechanism, and mechanism for passing a primary loop through the work and through a button eye and a secondary loop through the work and primary loop outside the eye at a point spaced transversely of the feed.

9. A button attaching machine, having, in combination, means for presenting shank-eyed buttons in attaching position, a reciprocating needle for passing primary and secondary button attaching loops through the work and for passing one of said loops through the button eye, and mechanism for moving the needle transversely of the feed between its primary and secondary strokes.

10. A button attaching machine, having, in combination, means for presenting shank-eyed buttons in attaching position, a reciprocating needle for passing a primary loop through the eye of the button and a secondary loop through the primary loop outside the eye, mechanism for moving the needle transversely of the feed between its primary and secondary strokes, and means for passing the secondary loop over the button head.

11. A button attaching machine, having, in combination, a work supporting horn, a vertically reciprocating hook needle above the horn, a looper within the horn, means for presenting buttons in attaching position, mechanism for moving the needle transversely of the horn between successive reciprocations, a loop taker for passing one of the needle loops over the button head, and mechanism for moving the work lengthwise of the horn to space the buttons.

12. A button attaching machine, having, in combination, a work supporting horn, a vertically reciprocating hook needle above the horn, a looper within the horn, means for presenting buttons in attaching position, mechanism for moving the needle transversely of the horn between successive reciprocations, a loop taker for passing one of the needle loops over the button head, a feeding finger, and mechanism for actuating the finger to engage a buttonhole in the work and bring it into register with the needle.

13. A button attaching machine, having, in combination, a reciprocating hook needle for passing a primary loop through a button eye and a secondary loop through the primary loop outside the eye, a looper for presenting the thread to the needle, and mechanism for turning the needle to reverse the direction in which its hook faces during successive reciprocations.

14. A button attaching machine, having, in combination, a reciprocating hook needle for passing a primary loop through a button eye and a secondary loop through the primary loop outside the eye, a loop taker for taking the secondary loop and carrying it over the button head, and mechanism for turning the needle to face its hook in the direction of movement of the loop.

15. A button attaching machine, having, in combination, a reciprocating hook needle for passing a primary loop through a button eye and a secondary loop through the primary loop outside the eye, mechanism for turning the needle to face its hook away from the bight of the primary loop while drawing the secondary loop therethrough, and a loop taker for taking the secondary loop and carrying it over the button head.

16. A button attaching machine, having, in combination, button attaching mechanism including a reciprocating needle, a button chute, a button carrier, mechanism for moving the carrier from the end of the chute to attaching position, for moving the carrier substantially parallel to the work to withdraw the button when partially attached, and for returning the carrier to button receiving position at the end of the chute.

17. A button attaching machine, having, in combination, button attaching mechanism including a reciprocating needle, a button chute, a button carrier, a support in which the carrier is pivoted, mechanism for oscillating the carrier to carry a button from the end of the chute to the attaching mechanism, and mechanism for moving the support to withdraw the button when partially attached.

18. A button attaching machine, having, in combination, button attaching mechanism including a reciprocating needle, a feed arm mounted to reciprocate in the line of feed over the work, and a spring pressed finger on the arm arranged to engage the surface of the work and enter a buttonhole therein.

19. A button attaching machine, having, in combination, a reciprocating needle for passing button attaching loops through the work, a head, loop taking fingers pivotally mounted in the head, a support in which the head is mounted, and mechanism for reciprocating the support, rocking the head, and swinging the fingers away from and toward each other.

20. A button attaching machine, having, in combination, means for presenting a shank eyed button in attaching position, a reciprocating needle for passing a primary loop through the eye of the button and a secondary loop through the primary loop outside the eye, mechanism for moving the needle transversely of the feed between its primary and secondary strokes, and a transversely movable loop taker for taking the secondary loop from the needle and carrying it over the button head.

WILLARD A. SMITH.